INVENTOR.
WILLIAM J. EVERETT Jr.
BY Sperry and Zoda
Attorneys

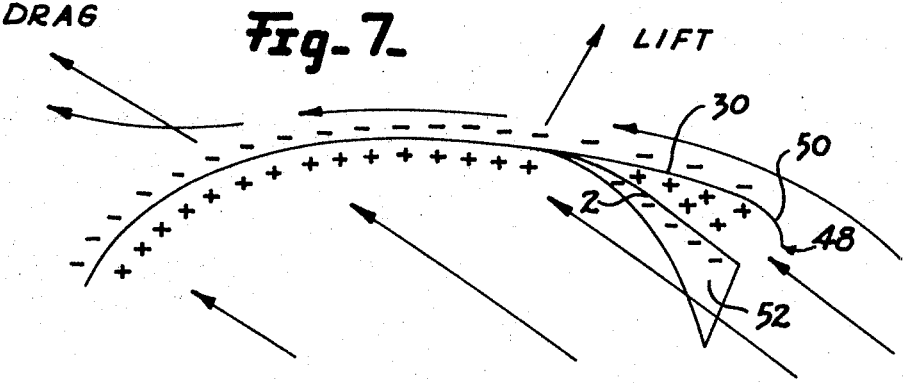
Fig-7-
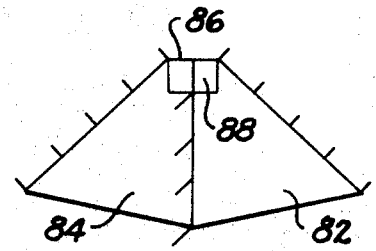
Fig-8-
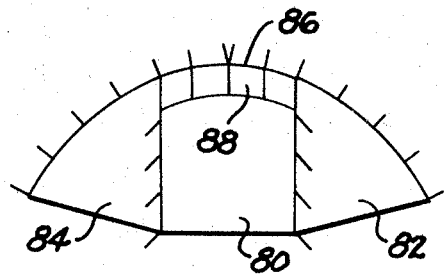
Fig-11-
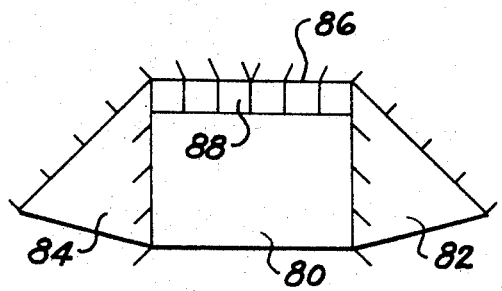
Fig-9-
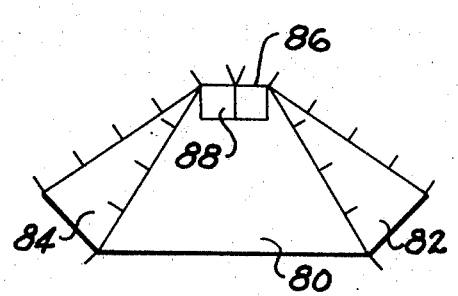
Fig-12-
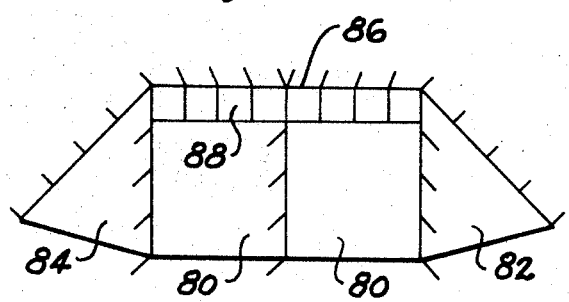
Fig-10-

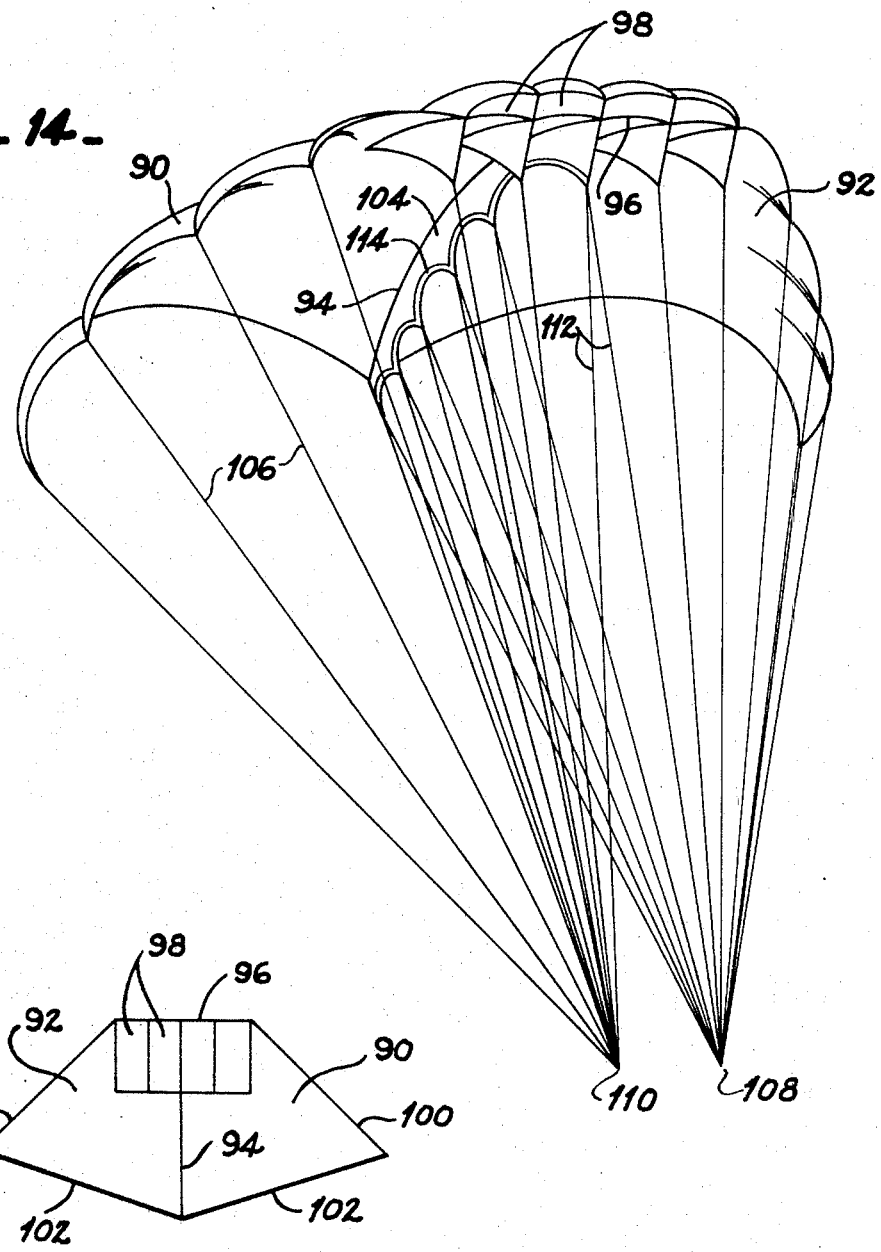

United States Patent Office 3,428,277
Patented Feb. 18, 1969

3,428,277
GLIDING PARACHUTE
William J. Everett, Jr., Vernon, Conn., assignor to Pioneer Parachute Company, Inc., Manchester, Conn., a corporation of Delaware
Filed Feb. 13, 1967, Ser. No. 615,487
U.S. Cl. 244—142    9 Claims
Int. Cl. B64d 17/00, 19/00

ABSTRACT OF THE DISCLOSURE

A gliding parachute having a canopy which is narrower adjacent the leading edge than at the trailing edge thereof and provided with at least one forwardly facing ram air receiving scoop adjacent the leading edge of the canopy for maintaining the leading edge extended when the parachute is in flight.

BACKGROUND OF THE INVENTION

Field of invention

This invention relates to gliding parachutes having a high lift to drag ratio whereby they may travel a relatively long distance horizontally during descent so as to be directed to a desired or predetermined landing point.

Description of the prior art

Gliding parachutes have generally heretofore been provided with air expelling vents for directing the parachute in a predetermined direction or have embodied a relatively flat canopy maintained in an inclined position by means of load lines attached to the canopy to cause the canopy to travel in a predetermined direction during descent. In some instances, the canopy has had a generally triangular shape in plan form to present a leading edge which is of less width than the trailing edge of the canopy in flight.

Such gliding parachutes are not only adapted for use at relatively low altitudes for dropping cargo or personnel, but are of particular advantage for use at relatively high altitudes or in rarified atmosphere for use as re-entry parachutes in the recovery of missiles or capsules. Typical gliding parachutes of the prior art are those shown in U.S. Patents Nos. 2,392,946; 2,546,078; 2,734,706; 3,099,426; 3,131,894 and 3,228,635.

However, whatever the form of the canopy employed in a gliding parachute, there is a tendency for the leading edge of the canopy to buckle or fold inwardly under the pressure of the air exerted on leading edge as the parachute travels forwardly. As a result, the flow of air beneath and about the canopy during descent is disturbed or distorted in such a way as to interfere with its travel and to render the operation of the parachute faulty or erratic.

SUMMARY OF THE INVENTION

In accordance with the present invention, gliding parachutes are provided with means positioned adjacent the leading edge of the canopy, which serve to maintain the leading edge extended and prevent buckling or inward folding of the leading edge during flight. For this purpose, the parachute canopy is provided with inflatable means adjacent the leading edge thereof which are preferably in the form of one or more air scoops positioned to receive ram air as the parachute travels forward. In this way, the leading edge is distended and reinforced by the air which would otherwise tend to cause the leading edge of the canopy to buckle inward beneath the canopy or interfere with the action of the parachute during the forward travel and descent thereof.

BRIEF DESCRIPTION OF THE DRAWING

FIG. 7 is a vertical sectional view through a further alternative form of gliding parachute embodying the present invention;

FIGS. 8 to 12 are diagrammatic plan views of alternative canopy configurations embodying the present invention;

FIG. 13 is a plan view of a further modification of the present invention; and

FIG. 14 is a perspective of a parachute canopy as shown in FIG. 13.

DESCRIPTION OF THE PREFERRED EMBODIMENT

Figure 1:
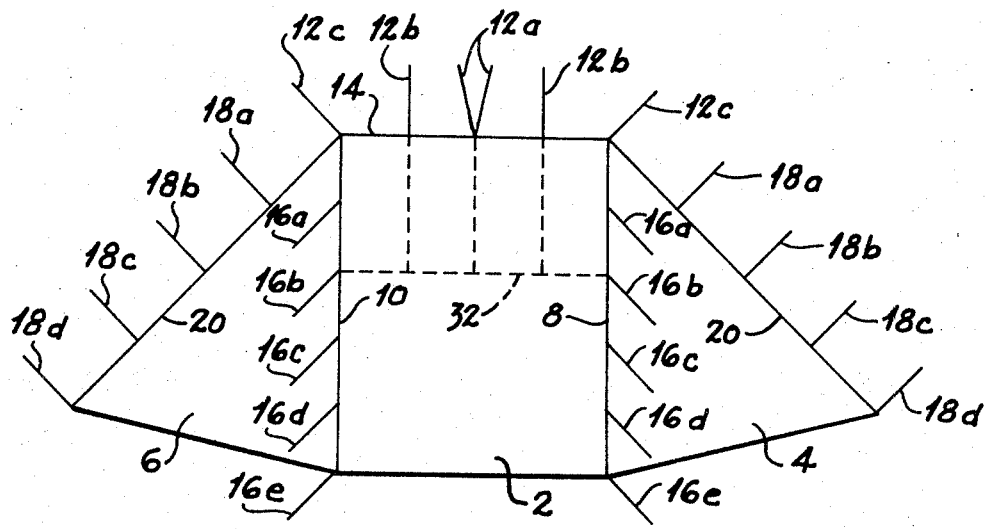
FIG. 1 is a plan view of a typical form of gliding parachute embodying the present invention.
Figure 2:
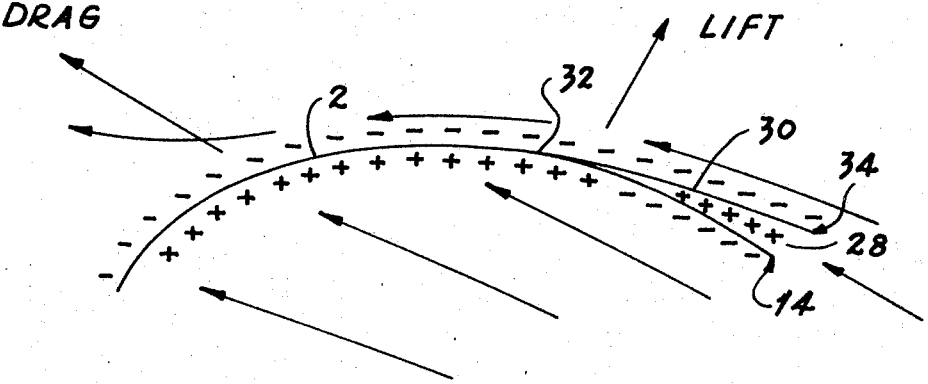
FIG. 2 is a vertical sectional view of the gliding parachute illustrated in FIG. 1.

In that form of the invention chosen for purposes of illustration in FIGS. 1 to 4 of the drawings, the parachute canopy embodies a central fabric panel 2 which preferably is generally rectangular in shape and has side panels 4 and 6 secured to the opposite longitudinal side edges 8 and 10 respectively of the central panel 2. The panels 2, 4 and 6 are preferably substantially flat in form although they may be shaped or contoured for a specific application. While each is illustrated as consisting of a single continuous sheet of fabric material, it should be understood that any one or more of these panels may embody a plurality of zones or areas of material secured together to form the panel. Furthermore, although the panels are preferably formed of fabric material such as nylon, silk, cotton or the like, it will be apparent that they may be formed of any suitable material desired. Moreover, the porosity of the panels may be the same, but if desired, the central panel 2 may be formed of fabric or sheet material of quite limited porosity while the side panels 4 and 6 may have a much higher porosity.

Load supporting lines 12a, 12b and 12c are connected to the canopy at spaced points along the leading edge 14 of the parachute canopy and additional load supporting lines 16a, 16b, 16c, 16d and 16e, may be connected to the canopy at spaced points along the longitudinal side edges 8 and 10 of the central panel 2 of the canopy. In a similar way, load supporting lines 18a, 18b, 18c and 18d may be connected to the side panels 4 and 6 at spaced points along the longer or front edges 20 thereof. The various load supporting lines 12a etc., 16a etc., and 18a etc., extend downwardly from the canopy to one or more load receiving points as indicated at 22 in FIG. 3.

The transverse width of the panels 2, 4 and 6 may be varied, but as shown in FIG. 1, the width of the central panel 2 is approximately equal to the maximum transverse width of each of the side panels 4 and 6. The length of the load supporting lines connected to the panels of the canopy is preferably varied to impart a predetermined contour to the parachute canopy and a predetermined angle of attack in flight. In a typical construction embodying the present invention, the load supporting lines 12a and 12b may be substantially equal in length and somewhat longer than the load lines 12c. In this way, the leading edge 14 may be given the desired form or curvature most suitable for any particular application or usage. In a similar way, the load lines 16a, 16b, 16c etc. connected to the longitudinal edges 8 and 10 of the central panel 2 can be progressively shorter in length than the lines connected to the leading edge 14, to establish a desired inclination or angle of attack of the central panel 2 of the parachute canopy. The length of the load lines 18a, 18b, 18c etc. which are connected to the marginal edges of the side panels 4 and 6 will generally be sorter than any of the load lines connected to the central panel 2 and may be chosen to maintain the side panels in predetermined normally inclined relation with respect to the central panel 2 of the canopy.

Figure 3:
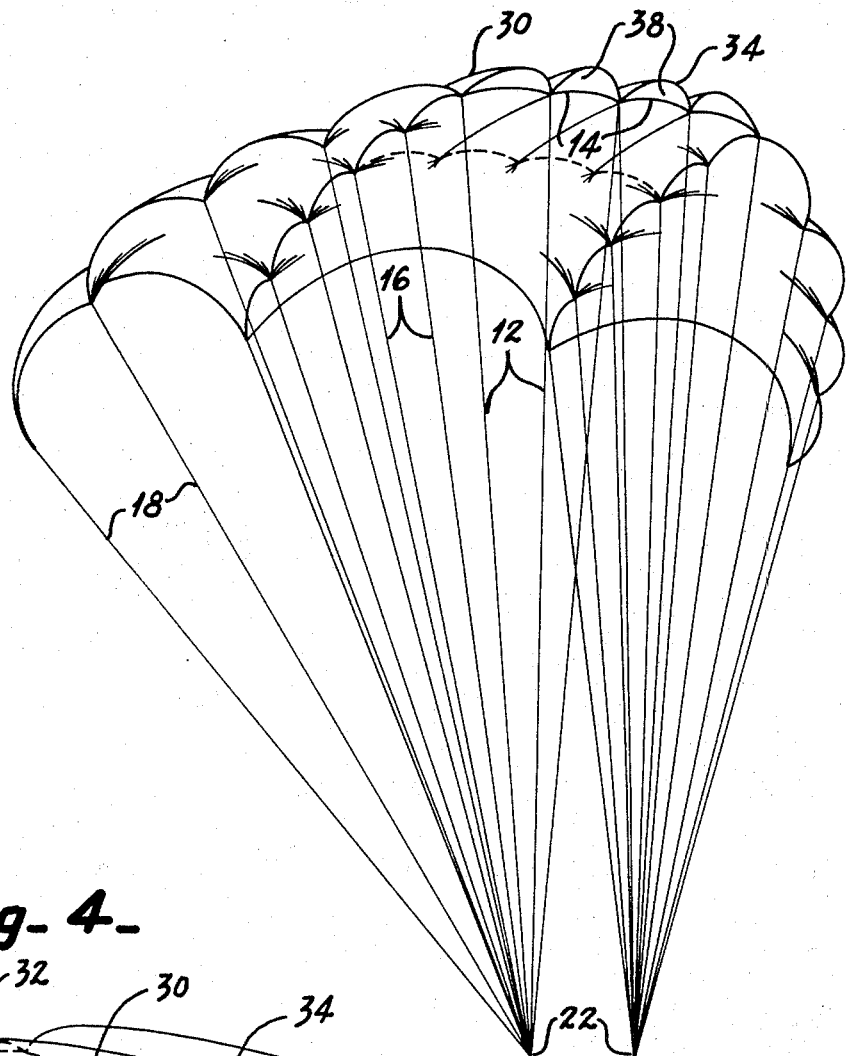
FIG. 3 is a perspective showing the parachute of FIGS. 1 and 2 in flight.

When the parachute canopy and load supporting lines are constructed and arranged as described above, the parachute canopy will be maintained at an angle of attack with respect to the direction of travel during descent, somewhat as illustrated in FIG. 3, and will travel forward in the direction of the arrow 26 at an angle of approximately 15° with respect to the horizontal. The lift to drag ratio of the parachute will then be approximately 3.7 or more.

In order to prevent the leading edge 14 of the parchute canopy from buckling downwardly and inwardly as the parachute travels forward during descent, the canopy is provided with inflatable means located adjacent the leading edge so as to hold said edge distended and relatively stiff. The inflatable means illustrated preferably is in the form of one or more forwardly facing ram air receiving scoops 28.

Such ram air scoops may be produced by securing a layer of fabric 30 to the upper surface of the central panel 2 of the parachute canopy along the rear edge 32 of said layer, at a line spaced from the leading edge 14 of the canopy. The front edge 34 of the layer of fabric 30 is preferably positioned in line with or ahead of the leading edge 14 of the central panel 2 so as to be raised by ram air entering the space between the upper surface of the canopy and the fabric layer 30. In this way, the ram air scoop 28 is provided along the leading edge 14 to hold said edge extended as the parachute travels forward.

Figure 4:
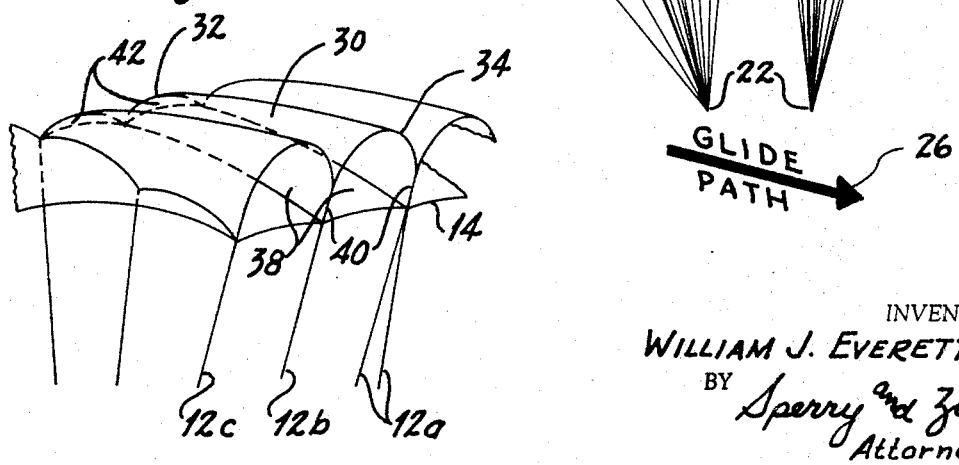
FIG. 4 is an enlarged perspective of a portion of the construction illustrated in FIG. 3.
Figure 5:
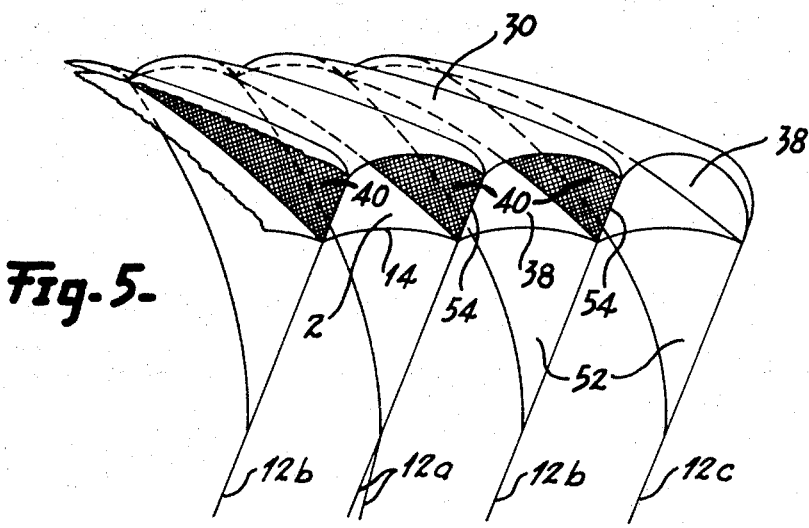
FIGS. 5 and 6 illustrate alternative embodiments of the construction shown in FIG. 4.
Figure 6:
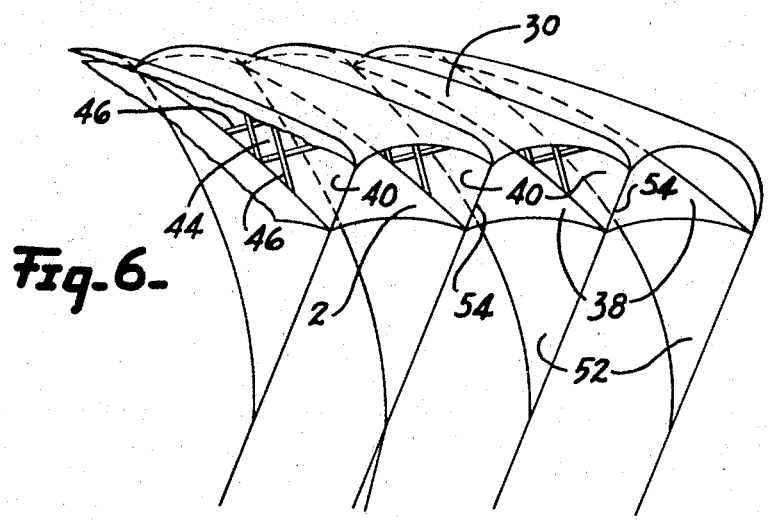

In order to prevent uncontrolled or undesired fluttering of the fabric layer 30 and in order to provide inflatable means of predetermined shape and size adjacent the leading edge of the parachute, the air scoop 28 is preferably divided vertically into a plurality of cells or pockets 38, by means of fabric dividers 40 which as shown in FIG. 4, are secured to the upper surface of the panel 2 of the canopy and the lower surface of the layer of fabric 30. For some purposes, if desired, the pockets 38 thus formed in the air scoop may be provided with restricted rear vents or openings 42 adjacent the rear edge of the layer 30 as illustrated in FIG. 4. Similarly as shown in FIG. 5, restricted lateral flow of air between the pockets 38 of the air scoop may be established by forming the dividers 40 of screen or open mesh fabric. As illustrated in FIG. 6, lateral vents 44 are provided with binding tapes 46 at the opposite sides thereof. In this way, limited communication between the pockets 38 is afforded so as to assure inflation of all of the pockets and substantial equalization of the pressure of the ram air therein to maintain the leading edge 14 of the canopy extended and inflated throughout the entire width thereof even when the direction of flight of the canopy is at a substantial angle to the direction of any wind currents through which the parachute may descend.

An additional or alternative feature of the applicant's invention is illustrated in FIGS. 5 and 6 and is shown in vertical section in FIG. 7. As there shown, the free edge 48 of the fabric layer 30 may be restricted or turned downwardly for a short distance as indicated at 50 to aid in confining the ram air within the air scoop and to reduce or prevent the formation of eddy currents or turbulence in the air stream flowing over the top of the canopy.

The parachute further is provided with vertically extending vanes 52 which are secured to the lower surface of the central panel 2 of the canopy and to the downwardly extending load supporting lines. The vanes 52 are thus positioned adjacent the leading edge 14 of the canopy and aid in directing air inwardly beneath the canopy to increase the lift of the parachute. The vanes 52 also tend to stabilize the parachute during flight and help to keep the leading edge of the parachute facing in the direction of intended flight or glide of the parachute during descent. Moreover, as shown in FIGS. 5 and 6, the vanes 52 are preferably aligned with the vertical dividers 40 of the air scoop 28. The load supporting lines 14 then may be provided with portions 54 which extend upward along the front edges of the dividers 40 and inwardly over the fabric layer 30 to strengthen said layer and dividers and to aid in maintaining the desired size, shape and contour of the ram air scoop adjacent the leading edge of the parachute.

While the invention has been shown and described as having a canopy wherein the central panel is rectangular and the side panels are triangular in shape, the shape and number of the panels employed in forming the canopy may be varied as desired for any particular application or use of the parachute. FIGS. 8 to 12 inclusive thus illustrate plan views of alternative configurations of the parachute canopy each of which embodies a central area or panel 80 composed of one or more sections or zones, and side panels 82 and 84 which are generally triangular in shape and extend rearwardly from the leading edge 86 of the central panel. Each form of parachute further is characterized by the provision of an inflatable or ram air scoop 88 which extends across the leading edge 86 of the central panel 80.

The parachute construction illustrated in FIGS. 13 and 14 is composed of two panels 90 and 92 which are joined together along a central longitudinally extending seam 94. The panels cooperate to present a forwardly facing leading edge 96 provided with inflatable ram air scoops 98. The panels 90 and 92 further present opposite and outwardly inclined front edges 100 and inwardly inclined rear edges 102. A vertically extending keel 104 extends downwardly from the seam 94 along the center line of the canopy to aid in directing the canopy forwardly during descent. Load lines 106 extend downwardly from the front edges 100 of the canopy to load supporting points 108 and 110. Further, load lines 112 extend downwardly from the keel 104 to the load supporting points 108 and 110. As shown in FIG. 14, the load lines 112 may be connected to the lower edge of the keel 104 by passage through arcuate or catinary seams 114 and one end of each of the load lines may be connected to the load point 108 whereas the other end of such line may be connected to the other load point 110. In this way, the central portion of the canopy may be drawn downward or depressed so that it will, in effect, embody two similar but opposite lobes extending outwardly and downwardly at opposite sides of the central keel 104.

In each of the forms of the invention shown and described, the load supporting lines may be manipulated manually or automatically to aid in guiding the parachute during descent to a predetermined or desired location. In this way, one or both of the side panels or the rear of the central panel may be drawn downward or deflected so as to steer the parachute or vary its angle of descent.

Those forms of the present invention wherein the central panel of the parachute canopy embodies two or more zones, as exemplified by FIG. 11 for example, may be provided with a plurality of longitudinally extending keels similar to that of FIGS. 13 and 14, if desired.

It will thus be apparent that parachutes embodying the present invention are capable of numerous modifications and variations to adapt the same to special or particular applications and uses. In view thereof, it should be understood that the particular embodiments of the invention shown in the drawings and described above are intended to be illustrative only and are not intended to limit the scope of the invention.

I claim:
1. An aerial wing of airfoil type having a canopy formed of flexible material and presenting a leading edge and a trailing edge, a layer of flexible material secured to said canopy and presenting a leading edge located near the leading edge of the canopy and presenting a rear edge which is secured to the canopy and in contact therewith at points along a line extending transversely of the canopy and spaced longitudinally from both the leading edge and the trailing edge of the canopy, said layer of flexible material cooperating with said canopy to provide an inflatable means in the form of a ram air scoop which is wholly located near the leading edge of the canopy and presents an air inlet opening which faces forwardly and a rear edge located adjacent said transversely extending line which serves to restrict the flow of air through the air scoop, said ram air scoop upon inflation serving to promote initial deployment of the canopy and thereafter serve as an aid in maintaining the leading edge of said canopy extended during flight.

2. An aerial wing as defined in claim 1 wherein
(a) a plurality of horizontally spaced dividers are secured to the canopy and layer of flexible material and
(b) are located between the canopy and layer of flexible material to divide the space therebetween into a plurality of forwardly facing ram air receiving scoops.

3. An aerial wing as defined in claim 2 wherein
(a) fabric vanes are aligned with said dividers and
(b) extend downwardly from said canopy, and
(c) are connected to the canopy and load supporting lines.

4. An aerial wing as defined in claim 1 wherein
(a) said canopy embodies
(1) a central panel, and
(2) side panels of generally triangular shape are,
(3) secured to and extending outwardly from opposite longitudinal edges of the central panel and ram air scoops.

5. An aerial wing as defined in claim 4 wherein
(a) said central panel is generally rectangular in shape.

6. An aerial wing as defined in claim 4 wherein
(a) said central panel is substantially flat.

7. An aerial wing as defined in claim 1 wherein
(A) said canopy embodies
(1) a central panel which is
(a) flat and
(b) substantially rectangular in shape,
(2) side panels
(a) are secured to opposite longitudinal edges of said central panel, and
(b) are substantially triangular in shape
(B) said inflatable means comprise
(1) a layer of fabric contacting the upper surface of the canopy along a line spaced from the leading and trailing edges of the central panel of the canopy,
(a) fabric dividers are connected to said layer of fabric and canopy to form a plurality of adjacent ram air receiving scoops facing in the direction of glide of the parachute, and
(C) vertically extending keels are
(1) secured to said canopy and load supporting lines of the parachute below the parachute canopy, and
(2) are located substantially parallel to the intended line of gliding flight of the parachute.

8. An aerial wing as defined in claim 1 wherein
(a) vanes are connected to the canopy near the leading edge thereof and extend downwardly from the canopy in longitudinally extending planes, and
(b) load supporting lines are connected to said vanes and serve to hold said vanes in substantially vertical planes.

9. An aerial wing having a substantially rectangular central panel presenting a leading edge and a trailing edge, substantially triangular side panels connected to the canopy along the opposite longitudinal edges of the central panel, a layer of flexible material presenting a rear edge connected to said central panel and in contact therewith along a transversely extending line spaced longitudinally from the leading and trailing edges of said central panel, said layer of flexible material presenting a front edge located near the leading edge of the central panel and movable away from the leading edge of the central panel in a vertical direction to present a forwardly opening ram air scoop, a plurality of horizontally spaced and longitudinally extending dividers connected to said central panel and said layer of flexible material and located therebetween in position to divide the ram air scoop into a plurality of adjacent pockets each of which is open near the leading edge of the central panel of the parachute and substantially closed at the rear thereof, suspension lines connected to the central panel of the parachute along the longitudinal edges thereof, additional suspension lines connected to the outer edges of said triangular side panels of the parachute, at least one keel connected to the central panel of the parachute and extending downwardly below the central panel, said keel extending longitudinally of the central panel parallel to the longitudinal edges thereof from a point near the leading edge of the parachute to a point near the trailing edge of the parachute, and additional suspension lines connected to said keel and serving to hold said keel in a substantially vertical plane generally parallel to the intended direction of flight of the parachute.

References Cited
UNITED STATES PATENTS

| | | | |
|---|---|---|---|
| 1,194,691 | 8/1916 | Adams | 244—145 |
| 1,644,251 | 10/1927 | Hawes | 244—145 |
| 3,167,279 | 1/1965 | Reffell | 244—145 |
| 3,131,894 | 5/1964 | Jalbert | 244—145 |
| 3,285,546 | 11/1966 | Jalbert | 244—145 |

MILTON BUCHLER, *Primary Examiner.*

R. A. DORNON, *Assistant Examiner.*

U.S. Cl. X.R.

244—146